US012776134B2

(12) United States Patent
Zhang et al.

(10) Patent No.: US 12,776,134 B2
(45) Date of Patent: Oct. 27, 2026

(54) METHOD OF GENERATING CLASSIFIER BY USING SMALL NUMBER OF LABELED IMAGES

(71) Applicants: University of Science and Technology of China, Hefei (CN); Beijing Research Institute, University of Science and Technology of China, Beijing (CN)

(72) Inventors: Yongdong Zhang, Hefei (CN); Zhihua Shang, Hefei (CN); Hongtao Xie, Hefei (CN); Yan Li, Hefei (CN)

(73) Assignees: UNIVERSITY OF SCIENCE AND TECHNOLOGY OF CHINA, Hefei (CN); BEIJING RESEARCH INSTITUTE, UNIVERSITY OF SCIENCE AND TECHNOLOGY OF CHINA, Beijing (CN)

( * ) Notice: Subject to any disclaimer, the term of this patent is extended or adjusted under 35 U.S.C. 154(b) by 1218 days.

(21) Appl. No.: 17/430,192

(22) PCT Filed: Mar. 12, 2020

(86) PCT No.: PCT/CN2020/079018
§ 371 (c)(1),
(2) Date: Aug. 11, 2021

(87) PCT Pub. No.: WO2020/192442
PCT Pub. Date: Oct. 1, 2020

(65) Prior Publication Data

US 2022/0156583 A1 May 19, 2022

(30) Foreign Application Priority Data

Mar. 26, 2019 (CN) ........................ 201910235392.2

(51) Int. Cl.
*G06V 10/82* (2022.01)
*G06F 18/214* (2023.01)
(Continued)

(52) U.S. Cl.
CPC .......... *G06V 10/806* (2022.01); *G06F 18/214* (2023.01); *G06F 18/2431* (2023.01);
(Continued)

(58) Field of Classification Search
CPC .... G06V 10/806; G06V 10/454; G06V 10/82; G06V 10/764; G06F 18/214; G06F 18/2431; G06N 3/063; G06N 3/08
See application file for complete search history.

(56) References Cited

U.S. PATENT DOCUMENTS

| | | | | |
|---|---|---|---|---|
| 9,014,481 | B1 | 4/2015 | Luqman et al. | |
| 10,846,552 | B1 * | 11/2020 | Wu | G06V 10/454 |

(Continued)

FOREIGN PATENT DOCUMENTS

| | | | |
|---|---|---|---|
| CN | 103514443 | A | 1/2014 |
| CN | 109102002 | A | 12/2018 |
| CN | 109919252 | A | 6/2019 |

OTHER PUBLICATIONS

Liu et al., ("Deep Few-Shot Learning for Hyperspectral Image Classification" (2018)) (Year: 2018).*

(Continued)

*Primary Examiner* — Li B. Zhen
*Assistant Examiner* — Sadik A Alshahari
(74) *Attorney, Agent, or Firm* — Osha Bergman Watanabe & Burton LLP

(57) ABSTRACT

A method of generating a classifier by using a small number of labeled images includes: pre-training a wide residual network by using a set of labeled data with a data amount meeting requirements, and determining portions of the pre- (Continued)

trained wide residual network except for a fully connected layer as a feature extractor for an image; randomly selecting, for a N-class classifier to be generated, N classes from a training set for each of a plurality of times; and for N classes selected each time: randomly selecting one or more images from each class of the N classes as training samples; extracting a feature vector from training samples of each class by using the feature extractor; inputting a total of N feature vectors extracted into a classifier generator; and sequentially performing a class information fusion and a parameter prediction for the N-class classifier by using the classifier generator.

2 Claims, 2 Drawing Sheets

(51) Int. Cl.

| | |
|---|---|
| ***G06F 18/2431*** | (2023.01) |
| ***G06N 3/063*** | (2023.01) |
| ***G06N 3/08*** | (2023.01) |
| ***G06V 10/44*** | (2022.01) |
| ***G06V 10/764*** | (2022.01) |
| ***G06V 10/80*** | (2022.01) |

(52) U.S. Cl.

CPC ............... *G06N 3/063* (2013.01); *G06N 3/08* (2013.01); *G06V 10/454* (2022.01); *G06V 10/764* (2022.01); *G06V 10/82* (2022.01)

(56) References Cited

U.S. PATENT DOCUMENTS

| | | | | |
|---|---|---|---|---|
| 2018/0039887 | A1* | 2/2018 | Shaji | G06V 10/764 |
| 2019/0012526 | A1* | 1/2019 | Guo | G06N 3/08 |
| 2019/0286986 | A1* | 9/2019 | Bin | G06N 3/08 |
| 2020/0242736 | A1* | 7/2020 | Liu | G06F 18/214 |

OTHER PUBLICATIONS

Wang et al., ("Large Margin Few-Shot Learning," (2018)). (Year: 2018).*
Sumbul et al., ("Multisource Region Attention Network for Fine-Grained Object Recognition in Remote Sensing Imagery," (Jan. 2019)). (Year: 2019).*
Sun et al., ("Meta-Transfer Learning for Few-Shot Learning," (2018)) (Year: 2018).*
NPL: Chen, Wei-Yu, et al. "A closer look at few-shot classification." (2018). (Year: 2018).*
NPL: Xu, Baohan, et al. "Dense dilated network for few shot action recognition." (2018). (Year: 2018).*
NPL: Zhu, Li, et al. "Few-Shot Classification Method Based on Support Set Class Feature Averaging." (2011). (Year: 2011).*
NPL: Gidaris et al., "Dynamic Few-Shot Visual Learning without Forgetting." (2018). (Year: 2018).*
International Search Report issued in International Application No. PCT /CN2020/079018 dated Jun. 11, 2020 (6 pages).
Written Opinion issued in International Application No. PCT /CN2020/079018 dated Jun. 11, 2020 (8 pages).
Zagoruyko, Sergey et al. "Wide Residual Networks" Université Paris-Est, École des Ponts ParisTech Paris, France, 2016 (15 pages).
Simonyan, Karen et al. "Very Deep Convolutional Networks for Large-Scale Image Recognition" Published as a conference paper at ICLR 2015 Visual Geometry Group, Department of Engineering Science, University of Oxford {karen,az}@robots.ox.ac.uk (14 pages).
Oreshkin, Boris N. et al. "TADAM: Task dependent adaptive metric for improved few-shot learning" 32nd Conference on Neural Information Processing Systems (NeurIPS 2018), Montréal, Canada (13 pages).
Snell, Jake et al. "Prototypical Networks for Few-shot Learning" 31st Conference on Neural Information Processing Systems (NIPS 2017), Long Beach, CA, USA (11 pages).
Vinyals, Oriol et al. "Matching Networks for One Shot Learning" 30th Conference on Neural Information Processing Systems (NIPS 2016), Barcelona, Spain (9 pages).
Sung, Flood et al. "Learning to Compare: Relation Network for Few-Shot Learning" Computer Vision Foundation {Iz, phst}@robots.ox.ac.uk <mailto:phst}@robots.ox.ac.uk> pp. 1199-1208 (10 pages).
He, Kaiming et al. "Deep Residual Learning for Image Recognition" Computer Vision Foundation {kahe, v-xiangz, v-shren, jiansun}@microsoft.com pp. 770-778 (9 pages).
Lake, Brenden M et al. "Human-level concept learning through probabilistic program induction" Science, Dec. 11, 2015 vol. 350 Issue 6266 pp. 1332-1338 (8 pages).
Koch, Gregory "Siamese Neural Networks for One-Shot Image Recognition" A thesis submitted in conformity with the requirements for the degree of Master of Science Graduate Department of Computer Science University of Toronto 2015 (30 pages).
Fei-Fei, Li et al. "One-Shot Learning of Object Categories" IEEE Transactions on Pattern Analysis and Machine Intelligence, vol. 28, No. 4, Apr. 2006 pp. 594-611 (18 pages).
Finn, Chelsea et al. "Model-Agnostic Meta-Learning for Fast Adaptation of Deep Networks" Proceedings of the 34th International Conference on Machine Learning, Sydney, Australia, PMLR 70, 2017 (10 pages).
Krizhevsky, Alex et al. "ImageNet Classification with Deep Convolutional Neural Networks" University of Toronto (9 pages).
Qiao, Siyuan et al. "Few-Shot Image Recognition by Predicting Parameters from Activations" Computer Vision Foundation pp. 7229-7238 (10 pages).

* cited by examiner

METHOD OF GENERATING CLASSIFIER BY USING SMALL NUMBER OF LABELED IMAGES

CROSS REFERENCE TO RELATED APPLICATION(S)

The present disclosure is a Section 371 National Stage Application of PCT International Application No. PCT/CN2020/079018, filed on Mar. 12, 2020, entitled "METHOD OF GENERATING CLASSIFIER BY USING SMALL NUMBER OF LABELED IMAGES", and the PCT International application claims priority to Chinese Patent Application No. 201910235392.2, filed on Mar. 26, 2019, which are incorporated herein by reference in their entireties.

TECHNICAL FIELD

The present disclosure relates to a field of artificial intelligence, and in particular to a method of generating a classifier by using a small number of labeled images.

BACKGROUND

Image classification is an image processing method that distinguishes different classes of objects according to their different features reflected in image information. Instead of human visual interpretation, the image classification uses a computer to perform a quantitative analysis on an image, and classifies the image or each pixel or region in the image into one of several classes.

At present, deep neural network-based classification methods are very mature, but most methods rely on massive amounts of labeled data. Furthermore, when the class of the image changes, these classification methods cannot adjust quickly, thereby affecting an effect of the image classification.

SUMMARY

An objective of the present disclosure is to provide a method of generating a classifier by using a small number of labeled images, so as to ensure accuracy of image classification.

In an aspect, the objective of the present disclosure is achieved by the following method.

There is provided a method of generating a classifier by using a small number of labeled images, including:

- pre-training a wide residual network by using a set of labeled data with a data amount meeting requirements, and determining portions of the pre-trained wide residual network except for a fully connected layer as a feature extractor for an image;
- randomly selecting, for a N-class classifier to be generated, N classes from a training set for each of a plurality of times; and
- for N classes selected each of the plurality of times:
  - randomly selecting one or more images from the each class of the N classes as training samples;
  - extracting a feature vector from training samples of each class, by using the feature extractor;
  - inputting a total of N feature vectors extracted into a classifier generator; and
  - sequentially performing a class information fusion and a parameter prediction for the N-class classifier by using the classifier generator.

In another aspect, the objective of the present disclosure is achieved by the following computer device.

There is provided a computer device of generating a classifier by using a small number of labeled images, including:

- a processor; and
- a memory having instructions executable by the processor, wherein the instructions, when executed by the processor, cause the processor to:
  - pre-train a wide residual network by using a set of labeled data with a data amount meeting requirements, and determine portions of the pre-trained wide residual network except for a fully connected layer as a feature extractor for an image;
  - randomly select, for a N-class classifier to be generated, N classes from a training set for each of a plurality of times; and
  - for N classes selected each of the plurality of times:
    - randomly select one or more images from each class of the N classes as training samples;
    - extract a feature vector from training samples of each class, by using the feature extractor;
    - input a total of N feature vectors extracted into a classifier generator; and
    - sequentially perform a class information fusion and a parameter prediction for the N-class classifier by using the classifier generator.

BRIEF DESCRIPTION OF THE DRAWINGS

In order to more clearly illustrate the technical solutions in the embodiments of the present disclosure, the accompanying drawings required in the description of the embodiments are briefly introduced below. Obviously, the accompanying drawings in the following description are only some embodiments of the present disclosure. For those ordinary skilled in the art, other drawings may be obtained from these drawings without carrying out any inventive effort.

DETAILED DESCRIPTION OF EMBODIMENTS

The technical solutions of the present disclosure are clearly and completely described below with reference to the accompanying drawings of the embodiments of the present disclosure. Obviously, the embodiments described are only a part but not all of the embodiments of the present disclosure. Based on the embodiments in the present disclosure, all other embodiments obtained by those ordinary skilled in the art without making inventive efforts fall within the protection scope of the present disclosure.

Figure 1:
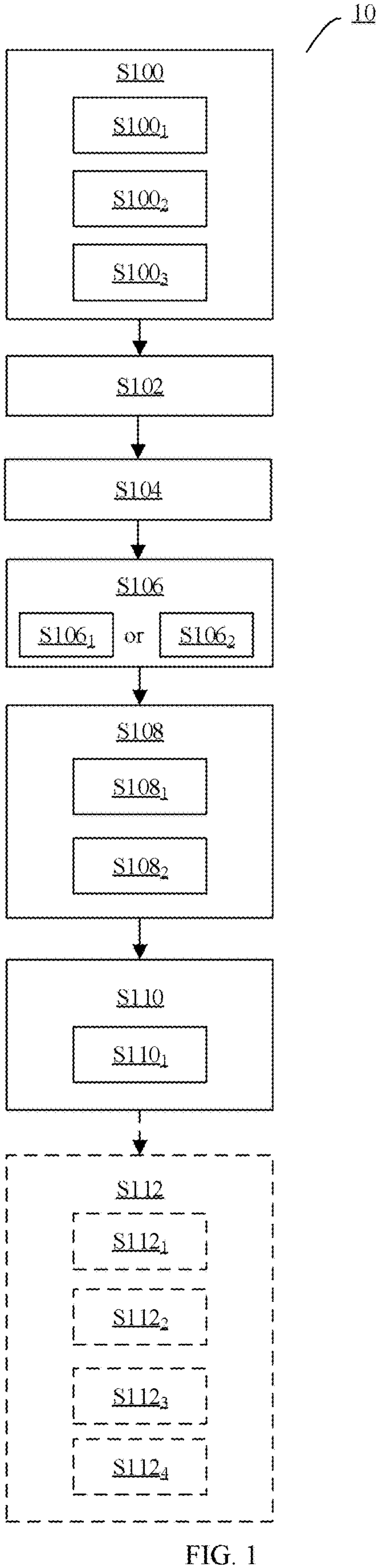
FIG. 1 shows a flowchart of a method of generating a classifier by using a small number of labeled images according to some embodiments of the present disclosure.
Figure 2:
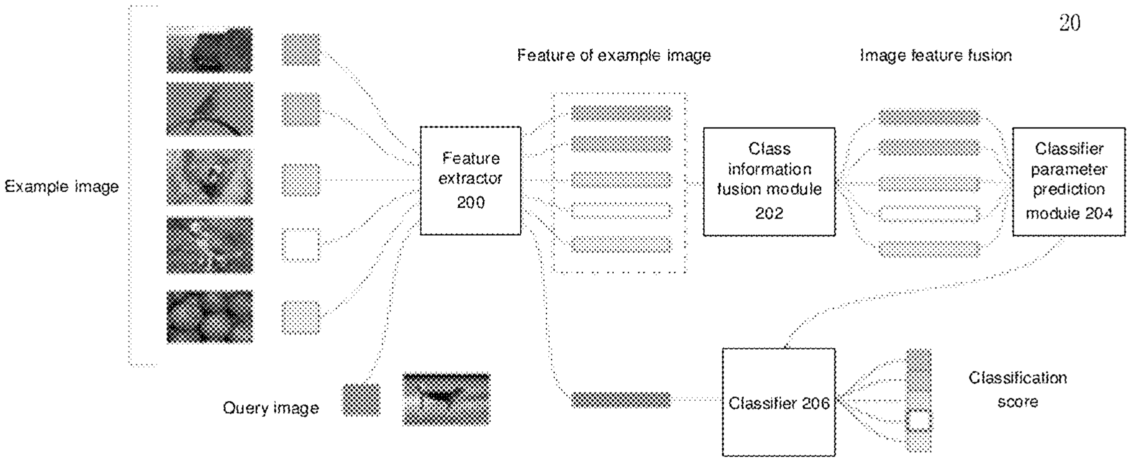
FIG. 2 shows a structural diagram of an apparatus of generating a classifier by using a small number of labeled images according to some embodiments of the present disclosure.

The embodiments of the present disclosure provide a method of generating a classifier by using a small number of labeled images. FIG. 1 shows a flowchart of a method 10 of generating a classifier by using a small number of labeled images according to some embodiments of the present disclosure. FIG. 2 shows a structural diagram of an apparatus 20 of generating a classifier by using a small number of labeled images according to some embodiments of the present disclosure. The flowchart of the method shown in FIG. 1 will be described below in conjunction with the structure shown in FIG. 2. As shown in FIG. 1, the method generally includes following steps.

In step S100, a wide residual network is pre-trained by using a set of labeled data with a data amount meeting requirements, and portions of the pre-trained wide residual network except for a fully connected layer are determined as a feature extractor 200 for an image.

In the embodiments of the present disclosure, the step S100 may include: at step S1001, a set of labeled data with a data amount meeting requirements is selected, and the set of labeled data is divided, according to image classes, into a training set and a test set that do not overlap each other; at step S1002, the wide residual network is trained for a predetermined number of times by using the training set; and at step S1003, the trained wide residual network is tested by using the test set.

The wide residual network includes a multi-layer convolutional neural network and a fully connected layer. In the pre-training process, after each image is input into the wide residual network, an output of the fully connected layer at the end of the wide residual network indicates a classification score of the input image being classified into each class.

In the pre-training process, a loss function is defined as:

$$L = \sum_i -s_{i,y} + \log\left(\sum_{y'} s_{i,y'}\right)$$

where $s_{i,y}$ indicates a classification score of an $i^{th}$ image to be classified being classified into a true class y in each batch training, and $s_{i,y'}$, indicates a classification score of the $i^{th}$ image being classified into the other class y'.

After a certain number of training and passing the test of the test set, the pre-training of the wide residual network is completed.

When the pre-training is completed, portions of the wide residual network except for the fully connected layer are retained as a feature extractor 200 for the image.

In step S102, for an N-class classifier 206 to be generated, N classes are randomly selected from the training set for each of a plurality of times. For N classes selected each time, step S104 to step S106 are performed.

In step S104, one or more images are randomly selected from each class of the N classes as training samples.

In step S106, a feature vector is extracted from the training samples of each class by using the feature extractor 200.

In the embodiments of the present disclosure, step S106 may further include one of step S1061 and step S1062.

At step S1061, if an image is extracted from each class as a training sample, a feature vector is extracted from each training sample, so that a total of N feature vectors are finally extracted for N classes.

At step S1062, if a plurality of images are extracted from each class as training samples, a plurality of feature vectors are extracted from a plurality of training samples of each class, and an average of the plurality of feature vectors are determined as the feature vector for the class, so that a total of N feature vectors are finally extracted for N classes.

In step 5108, a total of N feature vectors extracted are input into a classifier generator.

In the embodiments of the present disclosure, a specific value of N may be set according to requirements, and a number of the images selected from each class may also be set according to experience or requirements.

In step S110, a class information fusion and a parameter prediction for the N-class classifier are sequentially performed by the classifier generator. After step S104 to step S110 are performed for each randomly selected N classes, the N-class classifier 206 is obtained.

The classifier generator in the embodiments of the present disclosure may include a class information fusion module 202 and a classifier parameter prediction module 204.

In the embodiments of the present disclosure, step S108 may further include: at S1081, the feature vectors for the N classes are stitched to form a matrix with N rows; and at S1082, the matrix is input into the class information fusion module 202 to obtain a fusion feature matrix. Each row of the fusion feature matrix indicates a class feature for a corresponding row of the input matrix.

The class information fusion module 202 includes a fully connected layer having N input dimensions and N output dimensions.

In the embodiments of the present disclosure, step S110 may further include: at S1101, the fusion feature matrix is input into the classifier parameter prediction module 204 to predict a parameter of the N-class classifier 206.

The classifier parameter prediction module 204 includes a fully connected layer having input and output dimensions same as dimension of the feature vector of the image.

For example, if the feature extractor 200 may obtain a 640-dimensional vector for each input image, the classifier parameter prediction module 204 may have 640-dimensional input and output. The classifier parameter prediction module 204 may predict the parameter of the classifier 206 according to the output of the class information fusion module 202. For example, an N×640-dimensional matrix may be obtained according to the previous assumption. The matrix is the final classifier parameter, a 640-dimensional image feature is finally input into the N classifier 206, and an N-dimensional classification score is obtained. The class with the highest score is determined as a predicted class.

In addition, in the embodiments of the present disclosure, the method shown in FIG. 1 may optionally further include step S112, in which the N-class classifier 206 is trained after it is obtained. The training step S112 may include following steps: at $S112_1$, a certain number of (for example, 15) images are randomly selected from each of N classes as images to be tested; at $S112_2$, feature vectors of the images to be tested are extracted by using the feature extractor 200; at $S112_3$, the extracted feature vectors are input directly into the N-class classifier to predict classification scores of the images being classified into each class; and at $S112_4$, the parameter of the N-class classifier is updated according to a result of the prediction.

A loss function used in the training process of the N-class classifier is as follows:

$$L = \sum_i -s_{i,y} + \log\left(\sum_{y'} s_{i,y'}\right)$$

where $S_{i,y}$ indicates a classification score of an $i^{th}$ image to be classified being classified into a true class y in each batch training, and $s_{i,y'}$, indicates a classification score of the $i^{th}$ image being classified into the other class y'. The loss function is the same as that used in the pre-training of the wide residual network except for the number of the image classes involved.

In addition, when the training is completed, N new classes and one or more new samples of each class are given, and a new classifier may be directly generated to classify images of these N new classes. In particular, it may use only a sample for each new class during the training. In practice, if there are a plurality of available samples in a class, an average of the feature vectors of these samples may be used instead of the feature vector of a single sample.

The above solution according to the embodiments of the present disclosure is completely based on a 2D convolutional neural network. According to this solution, after training on a large training set, a classifier identifying new classes may be generated based on a small number of samples of the new classes. During the testing on a dedicated few-sample learning dataset, for the generation of a 5-class classifier (that is, N=5), when only one sample is used for each new class, the classification accuracy of the generated classifier may reach 60.04%, and when five samples are used for each new class, the classification accuracy may reach 74.15%.

Figure 3:
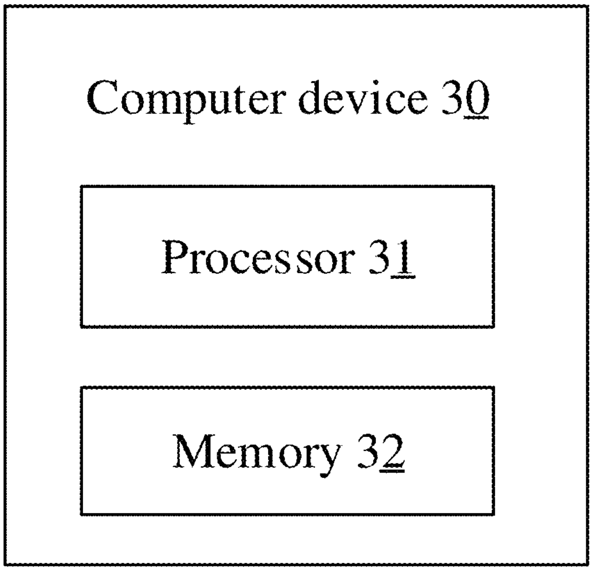
FIG. 3 shows a block diagram of a computer device of generating a classifier by using a small number of labeled images according to some embodiments of the present disclosure.

FIG. 3 shows a block diagram of a computer device 30 of generating a classifier by using a small number of labeled images according to some embodiments of the present disclosure. As shown in FIG. 3, the computer device 30 includes a processor 31 and a memory 32. The memory 32 may store instructions executable by the processor 31. The instructions, when executed by the processor 31, cause the processor 31 to perform the steps of the method shown in FIG. 1

Through the description of the above embodiments, those skilled in the art may clearly understand that the above embodiments may be implemented by software, or may be implemented by means of software with a necessary general hardware platform. Based on this understanding, the technical solutions of the above embodiments may be embodied in the form of a software product. The software product may be stored in a non-volatile storage medium (which may be a CD-ROM, U disk, mobile hard disk, etc.). The non-volatile storage medium includes several instructions to cause a computer device (which may be a personal computer, a server, or a network device, etc.) to perform the method described in various embodiments of the present disclosure.

The above-mentioned technical solutions of the present disclosure provide a method of generating a classifier. When classifying images of a new class, a new classifier may be generated by using a small number of images in the new class, so as to ensure the accuracy of image classification.

The above are only preferred specific implementations of the present disclosure, and the scope of protection of the present disclosure is not limited thereto. Any changes or substitutions that may be easily conceived by those skilled in the art within the technical scope disclosed in the present disclosure should be covered by the scope of protection of the present disclosure. Therefore, the scope of protection of the present disclosure should be determined by the scope of protection defined by the claims.

What is claimed is:

1. A computer device of generating a classifier by using labeled images, comprising:

a processor; and a memory having instructions executable by the processor, wherein the instructions, when executed by the processor, cause the processor to:

pre-train a wide residual network by using a set of labeled data, and determine portions of the pre-trained wide residual network except for a fully connected layer as a feature extractor for an image;

randomly select, for a N-class classifier to be generated, N classes from a training set for each of a plurality of times; and for N classes selected each of the plurality of times:

randomly select one or more images from each class of the N classes as training samples;

extract a feature vector from training samples of each class, by using the feature extractor;

input a total of N feature vectors extracted into a classifier generator; and sequentially perform a class information fusion and a parameter prediction for the N-class classifier by using the classifier generator, wherein the classifier generator comprises a class information fusion module and a classifier parameter prediction module; and wherein the instructions, when executed by the processor, further cause the processor to:

stitch feature vectors for the N classes to form a matrix with N rows;

input the matrix into the class information fusion module so as to obtain a fusion feature matrix, wherein each row of the fusion feature matrix indicates a class feature for a corresponding row of the matrix input; and input the fusion feature matrix into the classifier parameter prediction module, so as to predict a parameter of the N-class classifier, wherein the parameter of the N-class classifier is an N×d matrix, which is used to obtain a classification score with N dimensions, wherein a class corresponding to a dimension with a highest score among the N dimensions is determined as a predicted class, and d is a dimensionality of the feature vector of each image, wherein the class information fusion module comprises one fully connected layer having N input dimensions and N output dimensions, wherein the classifier parameter prediction module comprises one fully connected layer having input and output dimensions same as dimensions of the feature vector of the image, wherein extracting the feature vector from the training samples of each class by using the feature extractor comprises:

extracting a plurality of sub-feature vectors from a plurality of training samples of each class in response to extracting a plurality of images from each class as the training samples, and determining an average of the plurality of sub-feature vectors as the feature vector for the each class, so that the total of N feature vectors are finally extracted for N classes, wherein the processor trains the N-class classifier using additional labeled digital images of the N classes by: extracting, via the feature extractor, feature vectors of the additional labeled digital images; generating classification scores with the N-class classifier; and updating the classifier parameter values in accordance with a classification loss function associated with the N classes.

2. The computer device of claim 1, wherein the instructions, when executed by the processor, further cause the processor to:

select the set of labeled data, and divide the set of labeled data into the training set and a test set according to image classes, wherein the training set and the test set do not overlap each other;

train the wide residual network for a predetermined number of times by using the training set; and test the trained wide residual network by using the test set;

wherein the wide residual network comprises a multilayer convolutional neural network and a fully connected layer; and in the pre-training process, after each image is input into the wide residual network, an output of the fully connected layer at the end of the wide residual network indicates a classification score of the input image being classified into each class, and wherein, in the pre-training process, a loss function is defined as:

$$L = \sum_i -s_{i,y} + \log\left(\sum_{y'} s_{i,y'}\right)$$

wherein $s_{i,y}$ indicates a classification score of an $i^{th}$ image to be classified being classified into a true class y in each batch training, and $s_{i,y'}$ indicates a classification score of the $i^{th}$ image being classified into the other class y'.

* * * * *